(12) United States Patent
Rusch (10) Patent No.: US 9,903,746 B2
(45) Date of Patent: Feb. 27, 2018

(54) DRY PRODUCT DISPENSER WITH INTERNAL AGITATOR

(71) Applicant: Server Products, Inc., Richfield, WI (US)

(72) Inventor: Gerald A. Rusch, Fond du Lac, WI (US)

(73) Assignee: Server Products, Inc., Richfield, WI (US)

( * ) Notice: Subject to any disclaimer, the term of this patent is extended or adjusted under 35 U.S.C. 154(b) by 94 days.

(21) Appl. No.: 15/049,558

(22) Filed: Feb. 22, 2016

(65) Prior Publication Data

US 2017/0241824 A1 Aug. 24, 2017

(51) Int. Cl.
*A45D 24/22* (2006.01)
*B65D 83/00* (2006.01)
(Continued)

(52) U.S. Cl.
CPC .............. *G01F 11/24* (2013.01); *A47F 1/035* (2013.01); *A47G 19/34* (2013.01);
(Continued)

(58) Field of Classification Search
CPC ...... G01F 11/24; G01F 11/003; G01F 11/006; G01F 15/001; A47F 1/035; A47G 19/34; B65D 83/0083; B65D 83/06
(Continued)

(56) References Cited

U.S. PATENT DOCUMENTS 30,516 A * 10/1860 Ballantine .............. B65D 88/68
119/902
852,603 A 5/1907 Hanlon
(Continued)

FOREIGN PATENT DOCUMENTS

GB 116639 6/1918
GB 1182862 3/1970
(Continued)

OTHER PUBLICATIONS

US 5,241,123, 06/2001, Elmore (withdrawn)
European Search Report for European Patent Application No. 16196885.4 dated Jun. 8, 2017.

*Primary Examiner* — Jeremy W Carroll
(74) *Attorney, Agent, or Firm* — Andrus Intellectual Property Law, LLP (57) ABSTRACT

A dispenser includes a main body having a discharge opening, an open interior configured to receive a supply of granulated product and a discharge spout for dispensing the granulated product therefrom. A loading and dispensing member is constructed with a plurality of spaced apart receiving cavities formed therein, and is movably mounted within the main body. A portion control container receiving the granulated product and defining a first portion control volume is received and removably retained in each of the plurality of retaining cavities. Each entire portion control container is removable from one of the receiving cavities and is replaceable with a different portion control container defining a second portion volume which is different that the first portion volume. An agitator is positioned within the main body, and is configured for separate engagement with each of the portion control containers to agitate the granulated product received in each of the portion control containers during movement of the loading and dispensing member.

22 Claims, 6 Drawing Sheets

(51) Int. Cl.
  *G01F 11/24* (2006.01)
  *A47F 1/035* (2006.01)
  *A47G 19/34* (2006.01)
  *B65D 83/06* (2006.01)
  *G01F 11/00* (2006.01)
  *G01F 15/00* (2006.01)

(52) U.S. Cl.
  CPC ......... *B65D 83/0083* (2013.01); *B65D 83/06* (2013.01); *G01F 11/003* (2013.01); *G01F 11/006* (2013.01); *G01F 15/001* (2013.01)

(58) Field of Classification Search
  USPC .................................. 222/197, 370, 306
  See application file for complete search history.

(56) References Cited

U.S. PATENT DOCUMENTS

| | | | |
|---|---|---|---|
| 1,022,774 A | 4/1912 | De Julio | |
| 1,475,341 A | 11/1923 | Hanson | |
| 1,974,316 A | 9/1934 | Schoening | |
| 2,141,815 A | 12/1938 | Kelly | |
| 2,259,710 A | 10/1941 | Stern | |
| 2,475,381 A | 7/1949 | Erickson | |
| 2,575,967 A | 11/1951 | May | |
| 2,584,726 A | 2/1952 | McOmber | |
| 2,687,239 A | 8/1954 | Keenan | |
| 2,692,068 A | 10/1954 | Worswick | |
| 2,698,121 A | 12/1954 | Van Steyn | |
| 2,778,528 A | 1/1957 | Corcoran | |
| 2,820,577 A | 1/1958 | Winters et al. | |
| 2,858,859 A | 11/1958 | Mohr | |
| 2,920,796 A | 1/1960 | Field | |
| 2,933,763 A | 4/1960 | Alesi | |
| 3,033,164 A | 5/1962 | Evers | |
| 3,090,524 A | 5/1963 | Corcoran | |
| 3,091,368 A | 5/1963 | Harley et al. | |
| 3,169,675 A | 2/1965 | Gutzmann et al. | |
| 3,204,833 A | 9/1965 | Weitzner | |
| 4,009,788 A | 3/1977 | Waldhofer | |
| 4,053,087 A | 10/1977 | Lack et al. | |
| 4,058,238 A | 11/1977 | Eckman | |
| 4,074,832 A * | 2/1978 | McCarthy | B65D 88/66 222/245 |
| 4,079,860 A | 3/1978 | Maves | |
| 4,151,933 A | 5/1979 | Myers | |
| 4,162,751 A | 7/1979 | Hetland et al. | |
| 4,448,331 A | 2/1984 | Millette et al. | |
| 4,503,995 A | 3/1985 | Anderson | |
| 4,511,067 A | 4/1985 | Martin et al. | |
| 4,569,463 A | 2/1986 | Pellegrino | |
| 4,634,026 A | 1/1987 | Suay Puig et al. | |
| 4,860,930 A * | 8/1989 | Tu | G01F 11/24 222/231 |
| 4,892,233 A | 1/1990 | Zelickson | |
| 4,903,866 A | 2/1990 | Loew | |
| 4,957,219 A | 9/1990 | Robbins et al. | |
| 5,052,288 A | 10/1991 | Marquez et al. | |
| 5,064,104 A * | 11/1991 | Milton | G07F 11/44 222/306 |
| 5,222,635 A | 6/1993 | Chamo | |
| 5,258,090 A | 11/1993 | Becker et al. | |
| 5,292,037 A | 3/1994 | Held | |
| 5,303,672 A | 4/1994 | Morris | |
| 5,375,744 A | 12/1994 | Henderson | |
| 5,927,558 A | 7/1999 | Bruce | |
| 5,947,336 A | 9/1999 | Thompson | |
| 6,029,828 A | 2/2000 | Robbins et al. | |
| 6,182,864 B1 | 2/2001 | Elmore | |
| 6,357,345 B1 | 3/2002 | Cusenza et al. | |
| D469,661 S | 2/2003 | Rivkin | |
| D470,016 S | 2/2003 | Rivkin | |
| D471,407 S | 3/2003 | Rivkin | |
| 6,964,355 B2 | 11/2005 | Landau | |
| 7,731,063 B2 | 6/2010 | Rusch | |
| 8,276,791 B2 | 10/2012 | Huang | |
| 2002/0112613 A1 | 8/2002 | Cusenza et al. | |
| 2003/0234264 A1 | 12/2003 | Landau | |
| 2005/0098586 A1 | 5/2005 | Jensen | |
| 2006/0138167 A1* | 6/2006 | McMahon | A47G 19/183 222/100 |
| 2007/0181604 A1 | 8/2007 | Rusch | |
| 2011/0062187 A1 | 3/2011 | Johnson et al. | |
| 2011/0062190 A1 | 3/2011 | Johnson et al. | |
| 2012/0292349 A1 | 11/2012 | Zarou | |
| 2014/0305970 A1 | 10/2014 | Musumeci | |
| 2015/0276453 A1 | 10/2015 | Rusch | |

FOREIGN PATENT DOCUMENTS

| | | |
|---|---|---|
| GB | 2 289 671 A | 11/1995 |
| JP | H11114951 | 4/1999 |

* cited by examiner

DRY PRODUCT DISPENSER WITH INTERNAL AGITATOR

BACKGROUND OF THE INVENTION

The present disclosure relates to a device for dispensing dry granulated products or powders. More specifically, the present disclosure relates to a product dispenser that dispenses a user-selectable, measured portion of the granulated product.

In many restaurants and food establishments, many frozen food menu items, such as shakes, smoothies and blended ice cream drinks are made with different types of granulated dry products, such as chocolate candies, candy bar pieces and other small granulated products. It is desirable to use the same amount of the granulated product in the creation of the menu item.

Not only is there a need to dispense a known volume of the granulated product, it is also desirable to allow the adjustability of the amount of product dispensed based on the requirement of the restaurant or food service facility where the dispenser is located.

A dispenser for use in dispensing a selected volume of granulated dry product is disclosed in pending U.S. patent application Ser. No. 14/225,995 filed Mar. 26, 2014 and published Oct. 1, 2015 as U.S. Patent Application Publication No. 2015/0276453, both of which are herein incorporated by reference in entirety. This dispenser includes a main body having a discharge opening, an open interior for holding a supply of the granulated product and a discharge spout for dispensing the granulated product. A loading and dispensing member is constructed with spaced apart receiving cavities, and is movably mounted between the discharge opening and the discharge spout. A portion control container defining one selected portion volume is received and retained in each receiving cavity, and is replaceable with a different portion control container having a different portion control volume. A handle is frictionally engaged with the loading and dispensing member to enable rotation of the handle with or relative to the loading and dispensing member to sequentially control loading and dispensing of granulated product from the portion control container.

While the dispenser in the '995 application operates generally satisfactorily, it is known that granulated products are natural absorbers of moisture in the air. When absorption occurs, the granulated product can become clumped and/or hard and can be difficult to dispense. Accordingly, it is desirable to provide a dispenser for granulated products which avoids clumping or hardening problems, and aids in a consistent free flowing dispensation. It is also desirable to provide a dispenser which prevents a backwards rotational movement of the loading and dispensing member to ensure sequentially controlled loading and dispensing of the granulated product from the portion control containers.

SUMMARY OF THE INVENTION

The present disclosure relates to a dispenser used for loading and dispensing a selected volume of granulated product. The dispenser includes a main body having a discharge opening, an open interior configured to receive a supply of the granulated product and a discharge spout for dispensing the supply of granulated product therefrom. A loading and dispensing member is constructed with a plurality of spaced apart receiving cavities formed therein, and is movably mounted within the main body between the discharge opening and the discharge spout. A portion control container is received and removably retained in each of the plurality of receiving cavities, each portion control container defining a first portion volume and configured to receive the granulated product. Each entire portion control container is removable from one of the plurality of receiving cavities and replaceable with a different portion control container defining a second portion control volume which is different than the first portion volume. An agitator is positioned within the main body, and is configured for separate engagement with each of the portion control containers to agitate the granulated product received in each of the portion control containers during movement of the loading and dispensing member.

The present disclosure also relates to a dispenser used for loading and dispensing a selected volume of granulated product. The dispenser includes a main body having a discharge opening, an open interior configured to receive a supply of the granulated product and a discharge spout for dispensing the supply of granulated product therefrom. A loading and dispensing member is constructed with a plurality of spaced apart receiving cavities formed therein, and is movably mounted within the main body between the discharge opening and the discharge spout. A portion control container is received and removably retained in each of the plurality of receiving cavities. Each portion control container includes a bottom wall and a wall structure to define a first portion volume. Each portion control container is configured to receive the granulated product and is replaceable with a different portion control container defining a second portion volume which is different that the first portion volume. An agitator is mounted within the main body and is configured for engagement with the bottom wall and the wall structure of each portion control container upon receiving the granulated product therein. The agitator is configured upon movement of the loading and dispensing member to provide a kickback force applied to the granulated product for preventing clumping thereof.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
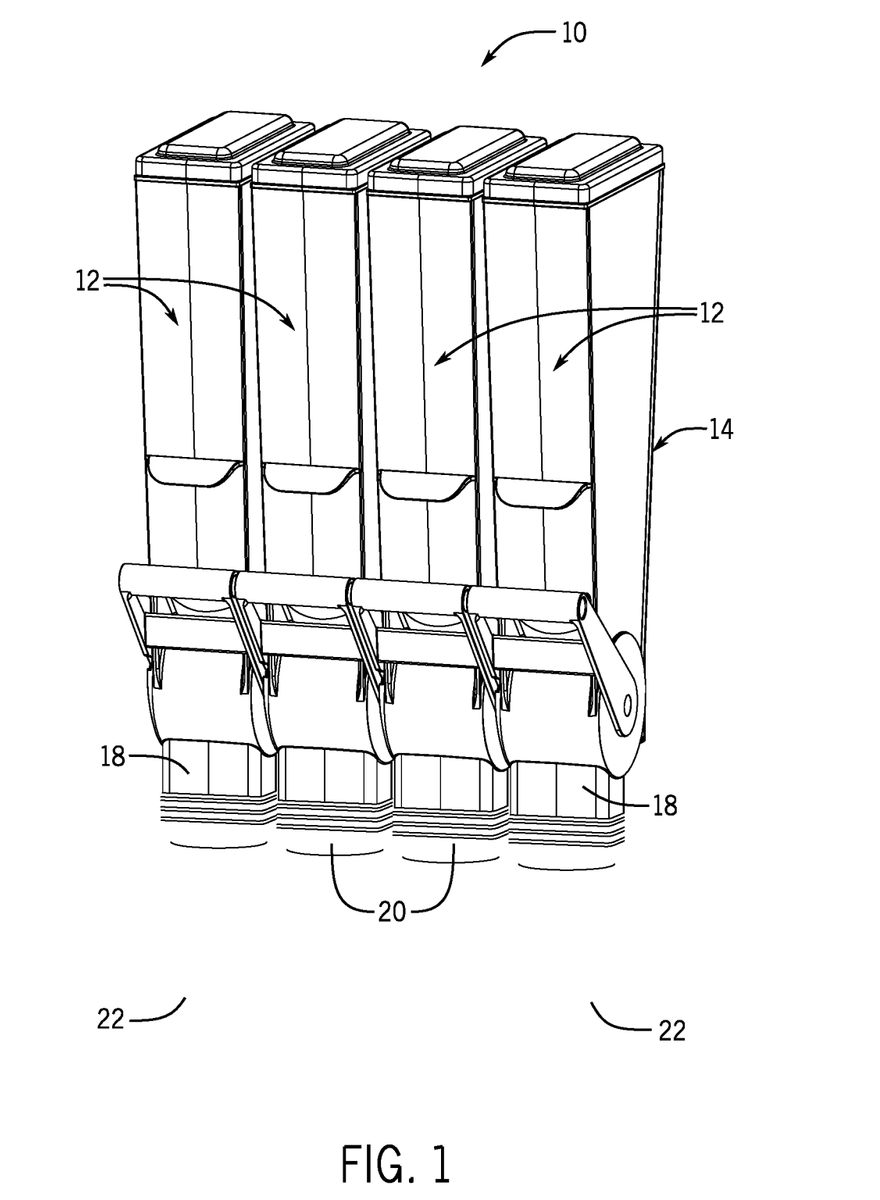
FIG. 1 is a perspective view of a side-by-side arrangement of product dispensers, each being constructed in accordance with the present disclosure.

FIG. 1 illustrates a dispensing arrangement 10 comprised of a series of dry product dispensers 12 mounted together in side-by-side relationship. In accordance with the present disclosure, each dispenser 12 is constructed with a main body 14 for storing a supply of granulated product 16 (FIG. 4) therein. As will be fully explained hereafter, the granulated product 16 is dispensed through a discharge spout 18 on the lower end of each main body 14. Each discharge spout 18 is connected with an adapter 20 which enables the product 16 to be dispensed into a container 22.

Figure 2:
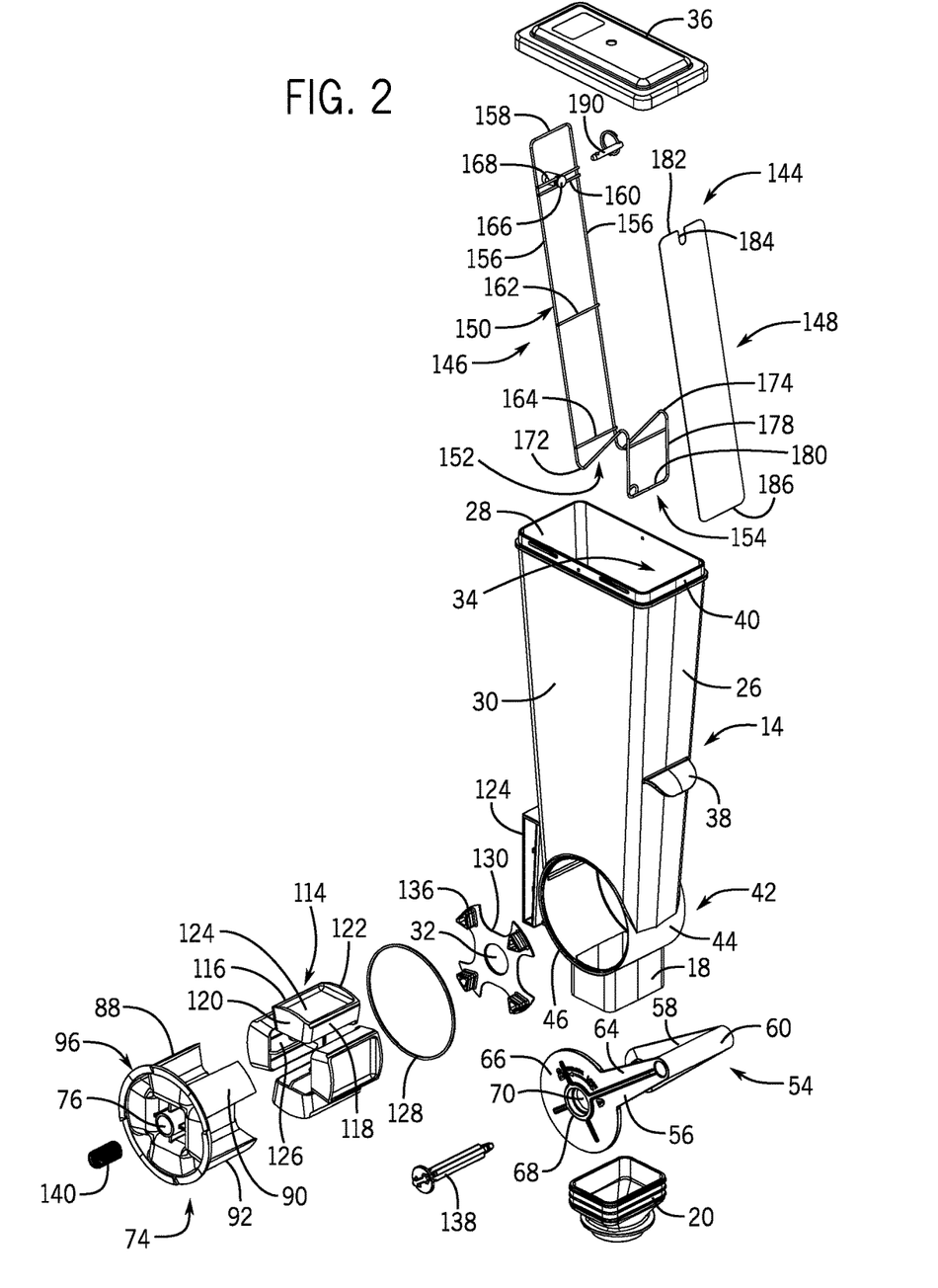
FIGS. 2 and 3 are exploded views of a single product dispenser shown in FIG. 1.
Figure 3:
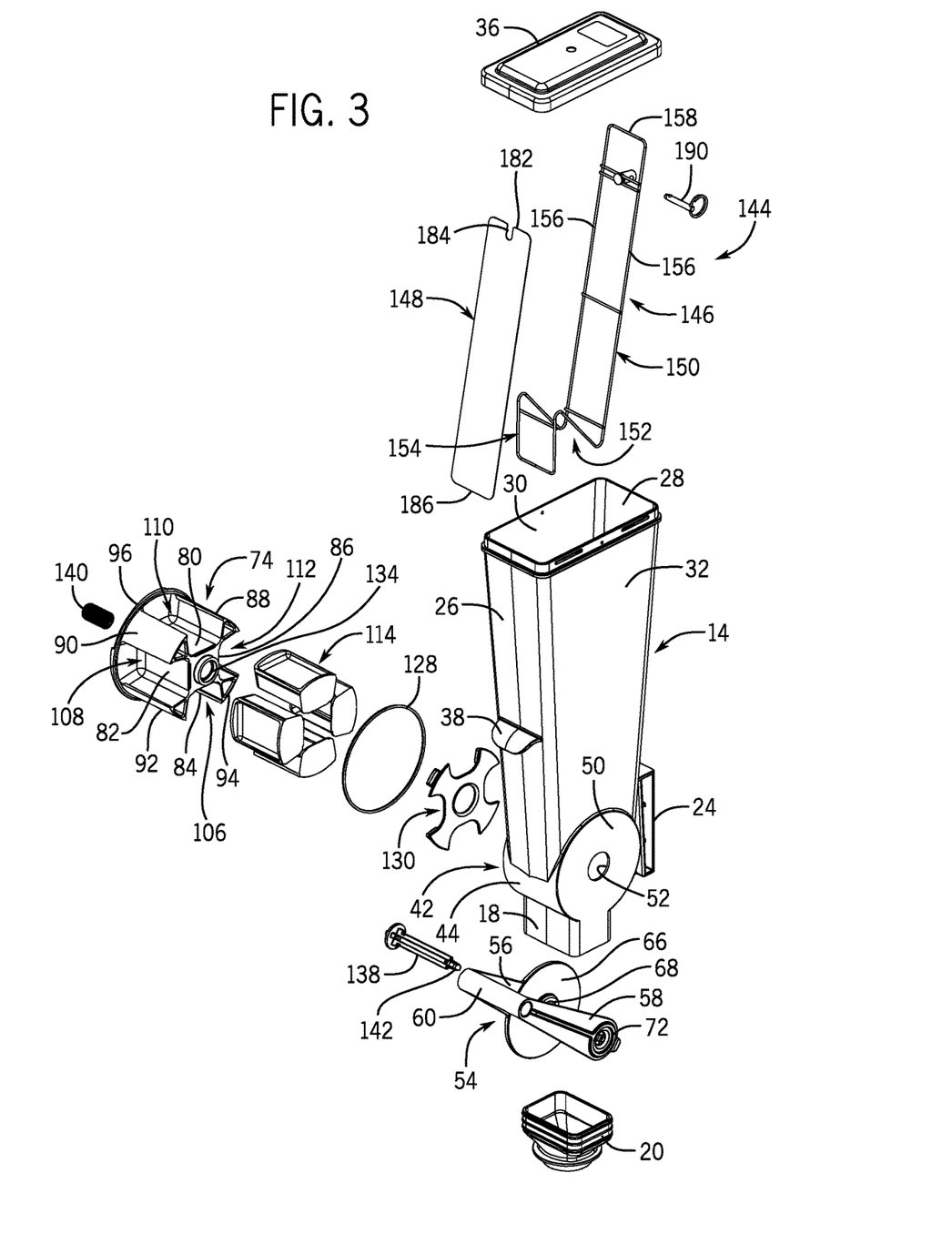
Figures 4, 5, 6:
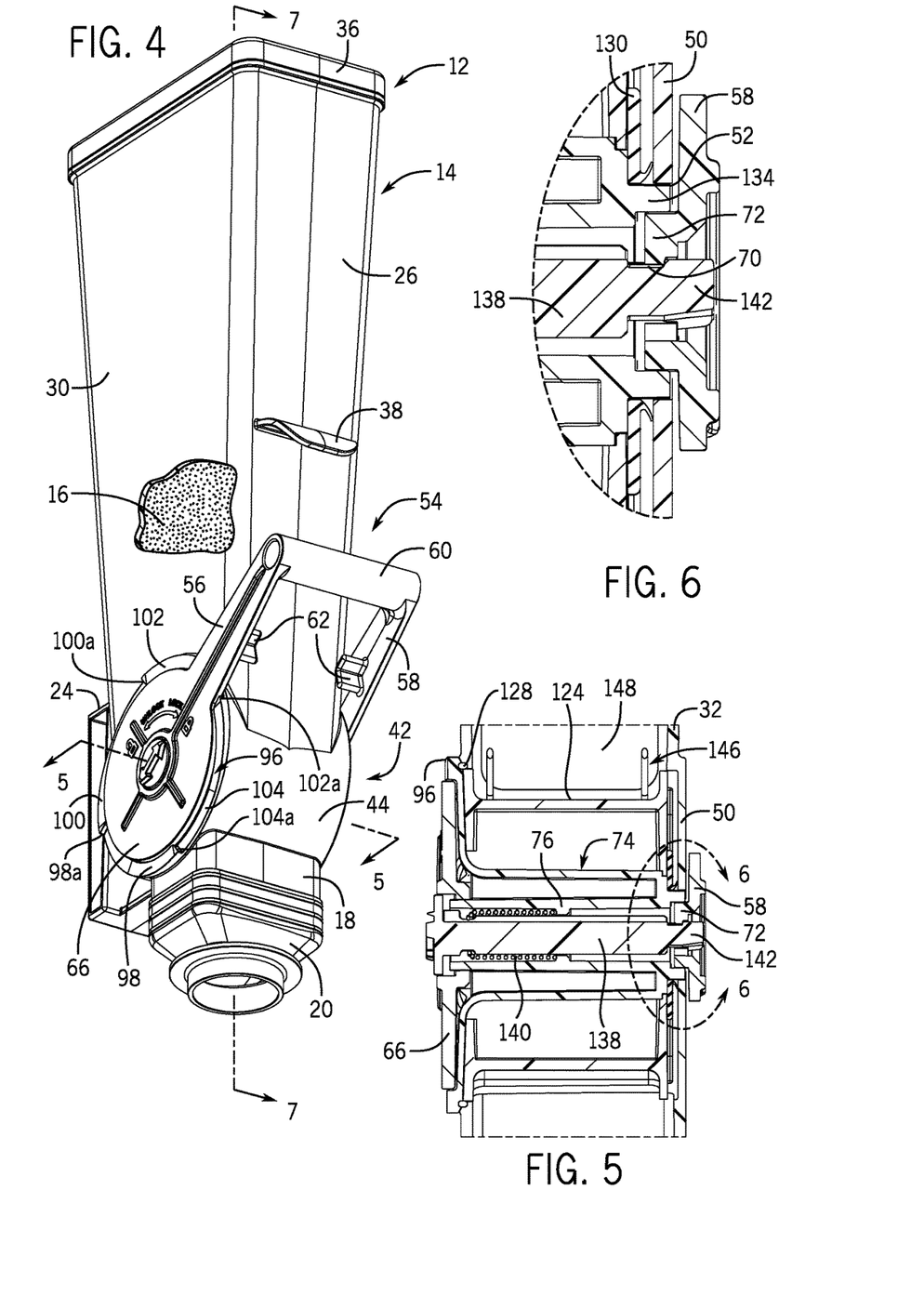
FIG. 4 is a perspective view of the product dispensers shown in FIGS. 2 and 3 in assembled form and filled with a supply of granulated product.
FIG. 5 is a sectional view of a loading and dispensing member of the product dispenser taken on line 5-5 of FIG. 4.
FIG. 6 is a detailed view of an end portion of the loading and dispensing member taken on line 6-6 of FIG. 5.

As seen in FIGS. 2-4, each dispenser 12 is provided with an attachment block 24 which is designed to be frictionally received and retained in a wedge-type fit within a retaining structure included on a mounting plate (not shown). Each mounting plate is normally designed to be affixed to a support surface, such as a wall or the like by passing suitable fasteners through holes in the mounting plate.

The main body 14 of each dispenser 12 includes a front wall 26, a rear wall 28, and a pair of side walls 30, 32 which together form an open interior 34 and hold the supply of granulated product 16 therein. A lid 36 is mounted to a top of the body 14, and forms a tight fit therewith to limit moisture within the open interior 34, and to enhance freshness of the granulated product 16. As an example, the granulated product 16 can be small candies, crushed candy bars, sugars, artificial flavors or any other type of granulated products that need to be dispensed. Preferably, the body 14 is formed with a molded plastic transparent material, although other materials that can be sanitized are considered to be within the scope of the disclosure.

The front wall 26 is provided with a lift element 38 which can be used to lift the attachment block 24 and the attached body 14 out of wedging relationship from the mounting plate when desired, such as for cleaning. The front wall 26 and the rear wall 28 converge from an upper end 40 to a lower section 42 of the body 14 having an arcuate front outer surface 44. As best depicted in FIG. 2, a lower end of the rear wall 28 defines an arcuate rear outer surface 46 of the lower section 42. The attachment block 24 is typically integrally formed on the lower end of the rear wall 28 and the rear outer surface 46 of the lower section 42. Together, inner walls of the arcuate front outer surface 44 and the arcuate rear outer surface 46 define a cylindrical internal cavity 48. As can be seen in FIG. 2, one side of the internal cavity 48 is open, while an opposite side of the internal cavity 48 has a circular sidewall 50 formed with a central throughhole 52, as depicted in FIG. 3. The lower section 42 is integrally formed with the discharge spout 18 which defines an outlet that directs the granulated product 16 in a controlled manner. The body 14, the discharge spout 18, the attachment block 24 and the lower section 42 are formed integrally preferably of a molded plastic material that can be easily sanitized.

Figure 7:
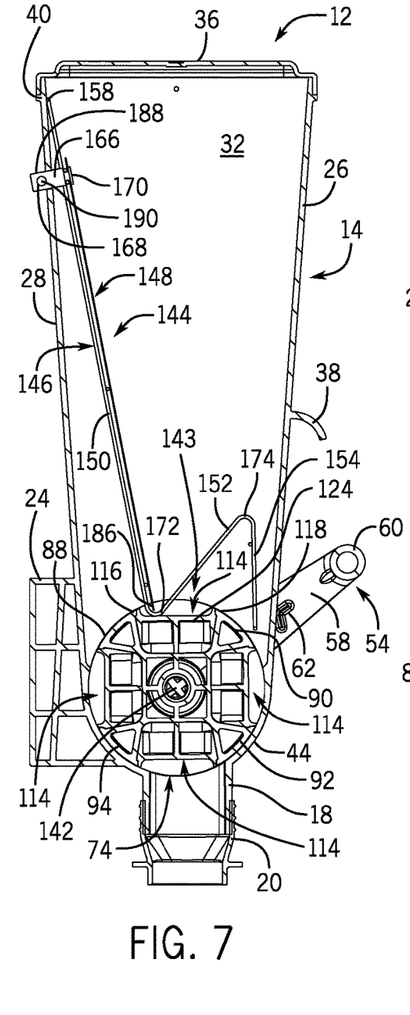
FIG. 7 is a partial sectional view of the product dispenser of FIG. 4 showing the dispensing handle in an upper position, the granulated product not being shown within the dispenser.
Figure 10:
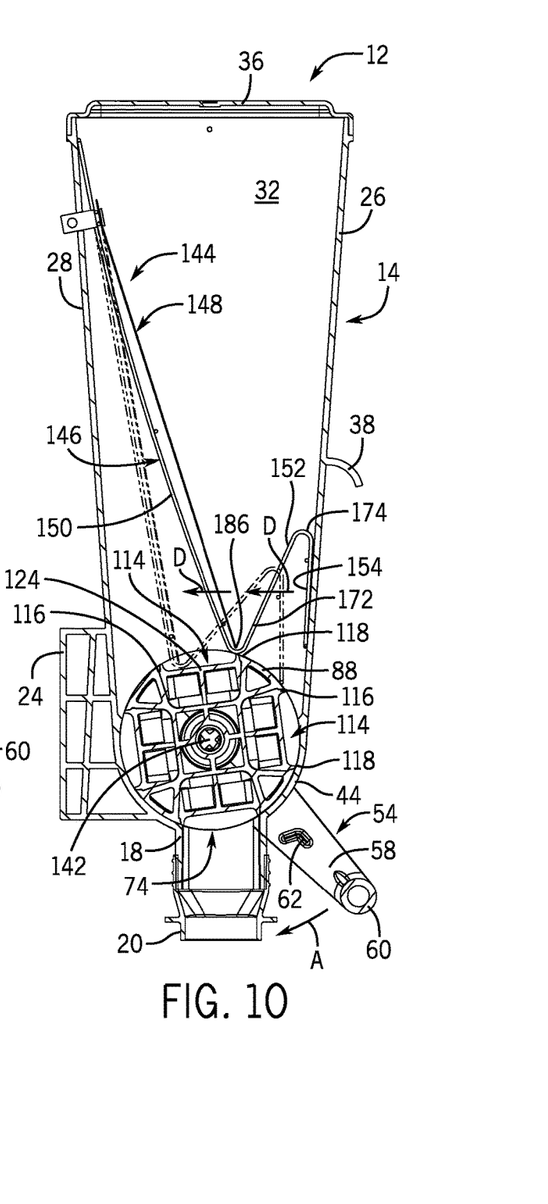
FIG. 10 is a view similar to FIG. 7 showing the movement of the dispensing handle to the lower position.

Each dry product dispenser 12 includes a unitary actuation or dispensing handle 54 which is movable through rotation between a first or upper position, such as shown in FIG. 7, and a second or lower position such as shown in FIG. 10. The handle 54 has a pair of spaced apart side arms 56, 58 and a crosspiece 60 joining upper ends of the side arms 56, 58. The side arms 56, 58 are constructed of a resilient material so that they may flex back and forth relative to the crosspiece 60. A spacer 62 (FIG. 4) is positioned on inside surfaces of the side arms 56, 58 beneath the crosspiece 60. The spacers 62 are designed to contact portions of the body 14 and the discharge spout 18 to aid in supporting movement of the handle 54 between its upper and lower positions. The side arm 56 has an upper portion 64 and a circular lower portion 66 formed with a protrusion 68 and a central hole 70 (FIG. 6). A lower end of the side arm 58 is constructed with a circular protrusion 72 designed to be received and retained in the throughhole 52 of the sidewall 50 at the opposite side of the internal cavity 48.

As further seen in FIGS. 2 and 3, the dispenser 12 includes a movable loading and dispensing member 74 which is rotatably received within the internal cavity 48 defined by the lower section 42. The member 74 has a cylindrical-like shape in the illustrated embodiment, and is positioned within the internal cavity 48 by passing the member 74 through the open end of the lower section 42.

The loading and dispensing member 74 has a center tube 76 which passes through a central core 78 defined by four interconnecting walls 80, 82, 84, 86 as best seen in FIG. 3. Four spaced apart sectors 88, 90, 92, 94 are connected to corners of the central core 78 and extend along a length thereof. The sectors 88, 90, 92, 94 include respective spaced apart arcuate walls designed to slidably engage the inner walls forming the internal cavity 48. One side of the arcuate walls is joined to a peripheral circular ring 96 configured to be engaged by a portion of the handle 54. The circular ring 96 is constructed with a series of four interconnected arcuate ramp surfaces 98, 100, 102, 104, each terminating in a respective tooth 98a, 100a, 102a, 104a as seen in FIG. 4.

As seen in FIG. 3, the loading and dispensing member 74 is formed with four spaced apart receiving cavities 106, 108, 110, 112. Each of the receiving cavities 106, 108, 110, 112 is sized to receive and retain an open top portion control device or container 114 with upstanding walls 116, 118, 120, 122 defining an upstanding wall structure, and a bottom wall 124 having a depending support fin 126 as best seen in FIG. 2. The sectors 88, 90, 92, 94 have outer edges used to retain the portion control containers 114 in the cavities 106, 108, 110, 112. Each portion control device 114 is identically sized to hold a selected internal volume of the granulated product 16.

It should be appreciated that the set of portion control containers 114 having identical selected volumes can be replaced with one or more different sets of portion control containers 114 having different identical selected volumes when it is desired to vary the dispensing portions of the granulated product 16. For example, the bottom wall 124 of each portion control container 114 can be variously located relative to the height of the walls 116, 118, 120, 122 to form replacement portion control devices or containers 114 with different identical volumes. Other constructions of the portion control containers 114 are contemplated by this disclosure.

An O-ring 128 is designed to be positioned on an inside surface of the circular ring 96. A friction pad 130 has a central hole 132 which receives an enlarged end 134 of the central tube 76. The friction pad 130 has spaced apart projections 136 which are frictionally received in cavities formed by the sectors 88, 90, 92, 94 in the loading and dispensing member 74. The friction pad 130 engages against portions of the upstanding walls 122 of the portion control containers 114. A pivot pin 138 is encircled on an axial portion thereof with a biasing spring 140.

As seen in FIGS. 5 and 6, when the loading and dispensing member 74 and the portion control containers 114 retained therein are positioned within the lower section 42, the enlarged end 134 of tube 76 is received between the forming wall of central hole 52 in circular side wall 50 and an outer wall of protrusion 72 on handle side arm 58. The shaft of pivot pin 138 is passed into the interior of tube 76 so that spring 140 is compressed. A head of the pivot pin 138 is received in the protrusion 68 on the circular lower portion 66 and is turned so that an engagement end 142 of the pivot pin 138 passing through the central hole 70 in side arm 58 is locked in place. As can be seen in FIG. 5, the O-ring 128 is sealingly positioned at the interface between the inner surface of ring 96 and an inner surface of side wall 30 surrounding the entrance to the internal cavity 48. The friction pad 130 is frictionally received between end walls of the sectors 88, 90, 92, 94 of the loading and dispensing member 74 and the inside surface of circular side wall 50. The friction pad 130 is designed to prevent back rotation of the loading and dispensing member 74 during a dispensing operation. At the same time, the handle side arm 56 is drivingly engaged with one of the teeth 98a, 100a, 102a, 104a on the circular ring 96 to allow the handle 54 to provide one-way rotational movement of the loading and dispensing member 74 between a discharge opening 143 (FIG. 7) in a lower end of the body 14 and the discharge spout 18. Such arrangement enables rotation and ratcheting movement of the handle 54 so that member 74 and the portion control containers 114 can be rotatably indexed for sequential loading and dispensing of granulated product 16 in a generally similar manner as set forth in detail in U.S. Patent Application Publication No. 2015/0276453 which is herein incorporated by reference in entirety.

A key feature of the present disclosure resides in the provision within the dispenser 12 of an agitator 144 which is designed to provide a spring action to disrupt the granulated product 16 loaded into each portion control container 114 during dispensing so that clumping, clogging or hardening of the granulated product 16 is prevented to aid in free flow dispensation.

As seen in FIGS. 2, 3 and 7-10, the agitator 144 includes an open resilient bent wireform member 146 and a solid resilient planar paddle 148 which is supported on and retained within the wireform member 146. In the preferred embodiment, both the wireform member 146 and the paddle 148 are formed from resilient metal material, but other resilient materials are contemplated by the present disclosure. The wireform member 146 is integrally formed with a rear portion 150, an intermediate portion 152 and a front portion 154. The rear portion 150 has a length which is longer than lengths of the intermediate portion 152 and the front portion 154. The rear portion 150 has spaced side members 156, a top member 158, a top cross member 160, an intermediate cross member 162 and a bottom cross member 164. The top cross member 160 is provided with a retainer stud 166 having a retaining hole 168 formed therein at one end and a stud head 170 formed at an opposite end. The intermediate portion 152 has side members 156 which are angled upwardly away from the rear portion 150 at a first bend 172. The front portion 154 has side members 156 which extend downwardly from a second bend 174. The front portion 154 includes an upper cross member 178 and a bottom member 180. The solid paddle 148 has a generally rectangular shape with a top edge 182 formed with a notch 184, and a straight bottom edge 186.

Referring now to FIGS. 7-10, the agitator 144 is configured such that the stud head 170 on the wireform member 146 is received and retained in the notch 184 on the paddle 148, and the bottom edge 186 of the paddle 148 is received in the bend 172 of the wireform member 146. With the paddle 148 connected on the rear portion 150 of the wireform member 146, the stud 166 is passed through a hole 188 formed in the upper end of the rear wall 28 of body 14 such that the retainer hole 168 extends outside the body 14. A detent pin 190 is then passed through the retainer hole 168 to retain the agitator 144 within the body 14 such that the upper end of rear portion 150 extends along the upper portion of rear wall 28 and the top edge 158 extends up to the upper end 40 of the body 14. Initially, the bend 172 holding the bottom edge 186 of the paddle 148 is engaged against the bottom wall 124 of the uppermost portion control member 114, and is spaced slightly forwardly of the rear upstanding wall 116 of the portion control container 114 as seen in FIG. 7. The front portion 154 of the wireform member 146 is spaced and disengaged from the dispenser front wall 26. It should be understood that while not shown in FIGS. 7-10, the interior 34 of the dispenser body 14 has been filled with granulated product 16 such that the agitator 144 extends downwardly through the product 16, and the bend 172 holding the bottom of paddle 148 projects into the uppermost portion control container 114 which is also filled with the product 16. With the handle 54 in the position of FIG. 7, the uppermost portion control container 114 has been aligned with the discharge opening 143 at the lower end of the body 14.

Figure 8:
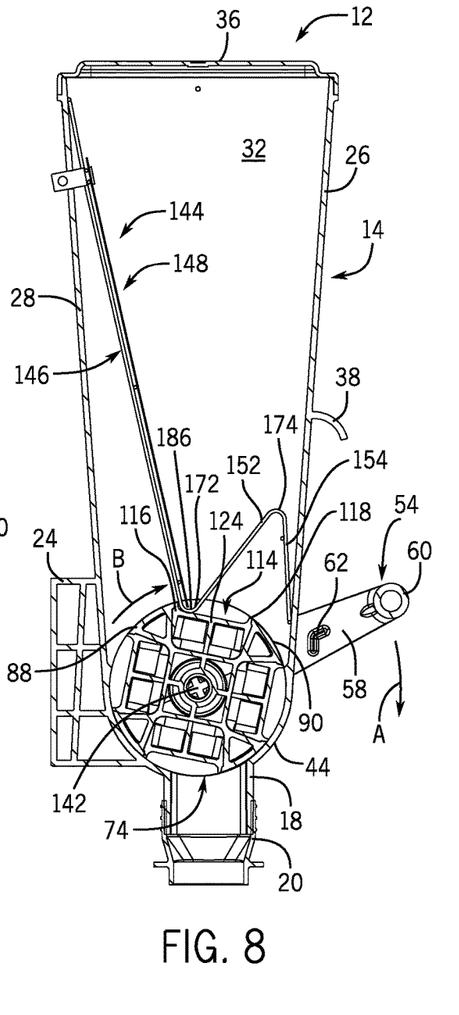
FIG. 8 is a view similar to FIG. 7 showing an initial movement of the dispensing handle from the upper position towards a lower position.

Referring now to FIG. 8, when it is desired to proceed with a sequential loading and dispensing operation of granulated product 16, the handle 54 is moved downwardly in the direction of arrow A, and the loading and dispensing member 74 with the portion control containers 114 are rotated in a clockwise direction represented by arrow B. As the loading and dispensing member 74 rotates, a lowermost end of the rear portion 150 forming the bend 172 and supporting the bottom edge 186 of the paddle 148 comes into engagement with the upstanding wall 116 of the filled uppermost portion control container 114. At the same time, the bottom edge 180 of the wireform front portion 154 contacts the inner surface of the dispenser front wall 26.

Figure 9:
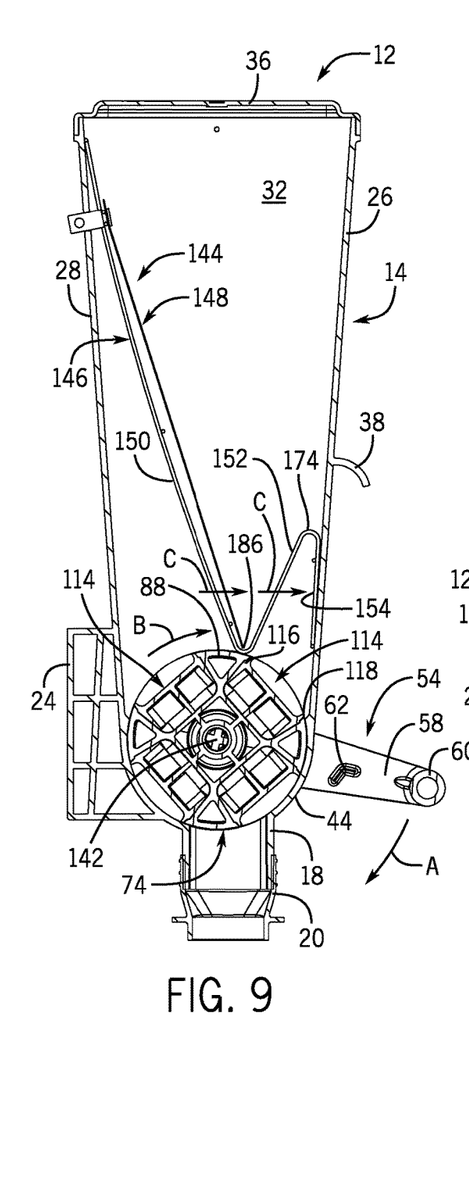
FIG. 9 is a view similar to FIG. 7 showing a further movement of the dispensing handle from the upper position towards a lower position.

As seen in FIG. 9, continued movement of the handle 54 and the member 74 in the direction of arrows A and B, respectively, causes the bend 172 and the bottom of paddle 148 to ride over the upstanding wall 116 and a leading edge of the arcuate surface of sector 88 on member 74. Simultaneously, a biasing force is applied by the agitator 144 in the direction of arrows C as the entire front portion 154 of the wireform member 146 is forced upwardly and against the inner surface of the dispenser front wall 26. The rear portion 150 bows slightly rearwardly relative to the paddle 148.

FIG. 10 illustrates the continued movement of the handle 54 and member 74 towards the lower position such that the bend 172 rides over the entire arcuate surface of sector 88 and the upstanding wall 118 of the indexed portion control container 114. Once the bend 172 overcomes the resistance of upstanding wall 118, the stored biasing force of the wireform member 146 and paddle 148 is released causing the bend 172 and the paddle 148 to snap or kick back in the direction of arrows D through the granulated product 16 loaded in the now uppermost portion control container 114 until the bend 172 is engaged in the position of FIG. 7 against the bottom wall 124 of the indexed portion control container 114 as represented by the phantom lines. This kickback force effectively disrupts the granulated product 16 as it is loaded in the portion control container 114 to prevent any clumping or hardening of the granulated product 16 so that free flow dispensation occurs through the spout 18. The bend 172 and the bottom of paddle 148 thus function as an agitating portion between the opposite ends 158, 180 of the agitator 144 for engaging and agitating the granulated product 16 loaded into each portion control container 114. This agitating and disrupting motion provided by the agitator 144 is repeated throughout the dispensing operation.

It should be appreciated that the agitator 144 is removably mounted within the main body 14, and can be easily removed if desired, by extracting the detent pin 190 from the retainer stud 166 so that the wireform member 146 and the paddle 148 can be lifted out of the main body 14.

In the present disclosure, certain terms have been used for brevity, clarity and understanding. No unnecessary limitations are to be inferred therefrom beyond the requirement of the prior art because such terms are used for descriptive purposes and are intended to be broadly construed. The different systems, apparatuses and method steps described herein may be used alone or in combination with other systems, apparatus and method steps. It is to be expected that various equivalents, alternatives, and modifications are possible within the scope of the appended claims. Each limitation in the appended claims is intended to invoke interpretation under 35 U.S.C. §112(f), only if the term "means for" or "step for" are explicitly recited in the respective limitation.

What is claimed is:

1. A dispenser for loading and dispensing a selected volume of granulated product comprising:
    a main body having a discharge opening, an open interior configured to receive a supply of the granulated product and a discharge spout for dispensing the supply of granulated product therefrom;
    a loading and dispensing member constructed with a plurality of spaced apart receiving cavities formed therein, and movably mounted within the main body between the discharge opening and the discharge spout;
    a portion control container received and removably retained in each of the plurality of receiving cavities, each portion control container defining a first portion volume and configured to receive the granulated product, each entire portion control container being removable from one of the plurality of receiving cavities and replaceable with a different portion control container defining a second portion volume which is different than the first portion volume;
    an agitator positioned within the main body and configured for separate engagement with each of the portion control containers to agitate the granulated product received in each of the portion control containers during movement of the loading and dispensing member; and
    wherein the agitator includes a V-shaped agitating portion which is configured to project into and out of the portion control container during movement of the loading and dispensing member.

2. The dispenser of claim 1, wherein the agitator is engaged with a bottom wall and an upstanding wall structure of each portion control container.

3. The dispenser of claim 2, wherein the upstanding wall structure includes a plurality of upstanding walls.

4. The dispenser of claim 1, wherein the agitator is configured to provide a kickback force for disrupting the granulated product received in each of the portion control containers.

5. The dispenser of claim 1, wherein the agitator is mounted for movement between front and rear walls of the main body.

6. The dispenser of claim 1, wherein the agitator is formed of a resilient structure.

7. The dispenser of claim 1, wherein the agitator has one end connected to a rear wall of the main body, and an opposite end which is engaged with and disengaged from a front wall of the main body.

8. The dispenser of claim 1, wherein the agitator includes an open resilient wireform member and a solid resilient paddle supported on and attached to the wireform member.

9. The dispenser of claim 8, wherein the wireform member is integrally formed with a rear portion, an intermediate portion and a front portion.

10. The dispenser of claim 9, wherein the wireform member has a pair of spaced apart side members interconnected by a top edge of the rear portion, a bottom edge on the front portion, and cross members on the rear portion and the front portion.

11. The dispenser of claim 9, wherein the intermediate portion is angled upwardly from the rear portion at a first bend.

12. The dispenser of claim 11, wherein the front portion is angled downwardly from the intermediate portion at a second bend.

13. The dispenser of claim 11, wherein the paddle has a rectangular planar shape having a top edge connected to an upper portion of the wireform member, and a bottom edge located within the first bend of the wireform member.

14. The dispenser of claim 8, wherein the rear portion of the wireform member is configured to bow rearwardly of the paddle during movement of the loading and dispensing member.

15. The dispenser of claim 1, wherein the loading and dispensing member is configured for one-way rotational movement within the main body, and includes a friction pad engaged against the main body to prevent a reverse rotational movement of the loading and dispensing member within the main body.

16. A dispenser for loading and dispensing a selected volume of granulated product comprising:
    a main body having a discharge opening, an open interior configured to receive a supply of the granulated product and a discharge spout for dispensing the supply of granulated product therefrom;
    a loading and dispensing member constructed with a plurality of spaced apart receiving cavities formed therein, and movably mounted within the main body between the discharge opening and the discharge spout;
    a portion control container received and removably retained in each of the plurality of receiving cavities, each portion control container including a bottom wall and wall structure to define a first portion volume, each portion control container being configured to receive the granulated product, each portion control container being replaceable with a different portion control container defining a second portion control volume which is different that the first portion volume; and
    an agitator mounted within the main body and configured for engagement with the bottom wall and the wall structure of each portion control container upon receiving the granulated product therein,
    wherein the agitator is configured upon movement of the loading and dispensing member to provide a kickback force applied to the granulated product for preventing clumping thereof; and
    wherein the agitator has one end connected to a rear wall of the main body, an opposite end engaged with and disengaged from a front wall of the main body and an upwardly-opening, V-shaped agitating portion which is positioned between the one end and the opposite end and configured to project into and out of each portion control container during movement of the loading and dispensing member.

17. The dispenser of claim 16, wherein the agitator is configured to provide a spring action for disrupting the granulated product in each portion control container.

18. The dispenser of claim 16, wherein the agitator includes a resilient bent wireform member and a resilient planar paddle supported on the wireform member.

19. The dispenser of claim 16, wherein the agitator is removably mounted within the main body.

20. The dispenser of claim 16, wherein the agitator is configured to provide the kickback force to the granulated product as each portion control container is loaded upon movement of the loading and dispensing member.

21. A dispenser for loading and dispensing a selected volume of granulated product comprising:
   a main body having a discharge opening, an open interior configured to receive a supply of the granulated product and a discharge sprout for dispensing the supply of granulated product therefrom;
   a loading and dispensing member constructed with a plurality of spaced apart receiving cavities formed therein, and movably mounted within the main body between the discharge opening and the discharge spout;
   a portion control container received and removably retained in each of the plurality of receiving cavities, each portion control container defining a first portion volume and configured to receive the granulated product, each entire portion control container being removable from one of the plurality of receiving cavities and replaceable with a different portion control container defining a second portion volume which is different than the first portion volume; and
   an agitator positioned within the main body and configured for separate engagement with each of the portion control containers to agitate the granulated product received in each of the portion control containers during movement of the loading and dispensing member;
   wherein the agitator includes an open resilient wireform member and a solid resilient paddle supported on and attached to the wireform member;
   wherein the wireform member is integrally formed with a rear portion, an intermediate portion and a front portion; and
   wherein the wireform member has a pair of spaced apart side members interconnected by a top edge of the rear portion, a bottom edge on the front portion, and cross members on the rear portion and the front portion.

22. A dispenser for loading and dispensing a selected volume of granulated product comprising:
   a main body having a discharge opening, an open interior configured to receive a supply of the granulated product and a discharge spout for dispensing the supply of granulated product therefrom;
   a loading and dispensing member constructed with a plurality of spaced apart receiving cavities formed therein, and movably mounted within the main body between the discharge opening and the discharge spout;
   a portion control container received and removably retained in each of the plurality of receiving cavities, each portion control container defining a first portion volume and configured to receive the granulated product, each entire portion control container being removable from one of the plurality of receiving cavities and replaceable with a different portion control container defining a second portion volume which is different than the first portion volume;
   an agitator positioned within the main body and configured for separate engagement with each of the portion control containers to agitate the granulated product received in each of the portion control containers during movement of the loading and dispensing member; and
   wherein the loading and dispensing member is configured for one-way rotational movement within the main body, and includes a friction pad engaged against the main body to prevent a reverse rotational movement of the loading and dispensing member within the main body.

* * * * *